April 1, 1958 — A. M. JOHNSTON — 2,828,734
PULSE INDICATOR
Filed May 17, 1955
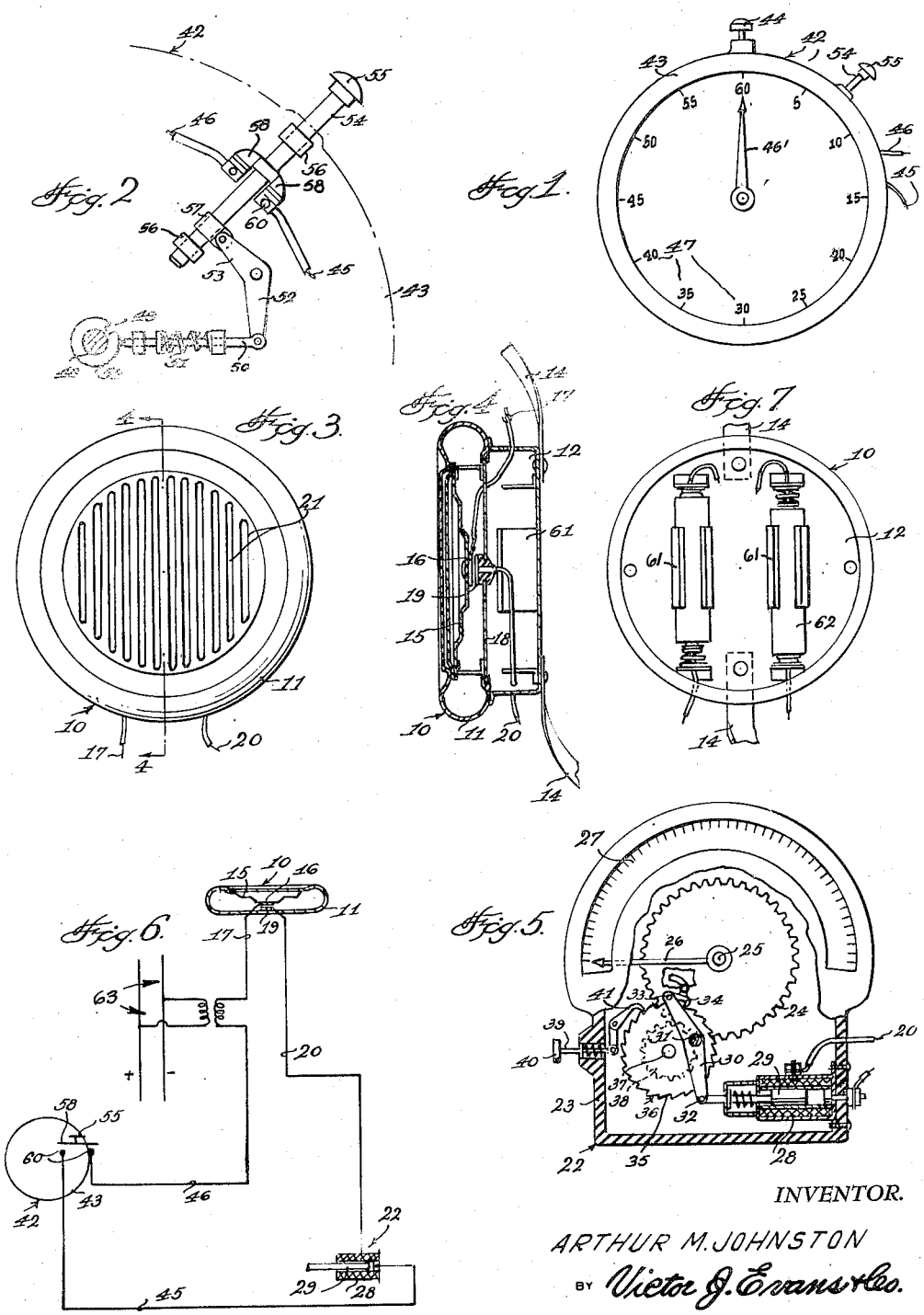
INVENTOR.
ARTHUR M. JOHNSTON

United States Patent Office 2,828,734
Patented Apr. 1, 1958

2,828,734

PULSE INDICATOR

Arthur M. Johnston, Warrensburg, Mo.

Application May 17, 1955, Serial No. 508,952

4 Claims. (Cl. 128—2.05)

This invention relates to an indicating mechanism, and more particularly to a mechanism for use in providing readings relating to a person's pulse or heart.

The object of the invention is to provide a mechanism which will enable doctors, nurses, and the like to readily learn or ascertain the condition of a person or patient's heart.

Another object of the invention is to provide an indicating mechanism which will permit doctors, nurses and the like to readily learn the rate of heart beat or heart beats in a given period of time so that the pulse rate of a patient can be readily measured.

A further object of the invention is to provide a pulse rate indicating mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a front elevational view of the stop watch for use with the present invention.

Figure 2 is a fragmentary elevational view, with parts broken away and in section, illustrating a portion of the stop watch.

Figure 3 is an elevational view of the pulse sending instrument.

Figure 4 is a sectional view taken on the line 4—4 of Figure 3.

Figure 5 is an elevational view, with parts broken away and in section, showing the receiving instrument.

Figure 6 is a schematic showing illustrating the wiring diagram for the electrical hook-up of the present invention.

Figure 7 is a fragmentary elevational view, with parts broken away and in section showing a modified arrangement of the sending instrument wherein batteries are used as a source of supply of electrical energy instead of a wall outlet or the like.

Referring in detail to the drawings, the numeral 10 designates a sending instrument which includes a hollow housing 11, Figure 4, and the sending instrument 10 is provided with a compartment 12. Flexible straps 14 of leather or the like are provided for attaching the sending device 10 to a patient's wrist, legs, or other part of the body. There is further provided within the housing 11, a movable diaphragm 15 which carries a contact 16, and the contact 16 is adapted to be connected to a suitable source of electrical energy through the medium of a wire 17. There is further provided in the housing 11 a partition 18 which has a stationary contact 19 connected thereto, and a wire 20 leads from the contact 19 for a purpose to be later described. The contact 16 is mounted for movement into and out of engagement with the contact 19 so as to complete the electrical circuit therebetween, as the diaphragm 15 flexes in response to the pulsations of the part which effects the bloodstream. The housing 11 is further provided with a plurality of spaced parallel slots or cutouts 21, Figure 3, and these slots 21 permit the pulsations from the heart or blood to be more readily picked up and conveyed to the diaphragm 15.

The indicating mechanism of the present invention further includes a receiving instrument which is indicated generally by the numeral 22, and the receiving instrument 22 includes a hollow casing 23 which may be made of insulated material, Figure 5. A shaft 25 in the casing 22 supports a gear 24, and a pointer or hand 26 is also mounted on the shaft 25, the pointer 26 adapted to coact with a graduated dial or scale 27.

Arranged within the casing 23 is a solenoid 28 which has a reciprocatory plunger or piston 29 mounted therein, and one end of the wire 20 is connected to the solenoid 28.

A lever 30 is positioned in the casing 23, and the lever 30 may be mounted on a pivot pin 31, and the lever 30 may be pivotally connected to the outer end of the plunger 29 by means of a pivot pin 32. A pin 33 connects the other end of the lever 30 to a dog or pawl 34 which is arranged in engagement with a toothed gear section 35 that may be mounted on a shaft 37. There is further provided a smaller gear section 38 which is also mounted on the shaft 37, and the teeth of the gear section 38 mesh with the teeth of the gear 24. The numeral 36 designates the two gear sections 35 and 38 which rotate in unison.

There is further provided a manually operable means for returning the hand 26 to the zero position as shown in Figure 5, and this manually operable means comprises a shank or stem 39 which has a head 40 on its outer end. The movable stem 39 can be used for actuating a dog or pawl 41 which is arranged in engagement with the gear section 35. Thus, by manually gripping the head 40 and moving the stem 39, the dog 41 can be used to rotate the gear section 35 which in turn rotates the gear section 38 whereby the gears 24 can be rotated to cause the hand 26 to return to its zero position so that it can be used over and over again.

There is further provided a stop watch which is indicated generally by the numeral 42, and the stop watch 42 includes a body portion 43 and a stop and start push button 44, there being a wire 45 leading from the stop watch 42 to the receiving instrument 22, there being a wire 46 connected to the stop watch 42, while power supply lines 63 are shown in Figure 6. A pointer or hand 46' is adapted to coact with the numerals 47 on the stop watch face or dial.

The stop watch 42 further includes a shaft 48 upon which the hand 46 is mounted, and a collar 59 is mounted on the shaft 48, there being a slot 49 in the collar 59. A pin 50 has a coil spring 51 thereon, and an end of the pin 50 is mounted for movement into and out of engagement with the slot 49. Links 52 and 53 are interconnected together, and the link 52 may be pivotally connected to an end of the pin 50. A plunger or stem 54 is slidably mounted in guides 56, and a knob 55 is mounted on the end of the stem 54 for manually actuating the stem 54. A clamp 57 connects the link 53 to the stem 54. A contact member 58 is carried by the stem 54, and the contact member 58 is adapted to bridge or selectively close the electrical circuit between a pair of terminals or contact members 60 to which the wires 46 and 45 are connected.

Referring to Figure 7 of the drawings, there is shown a slight modification wherein a pair of batteries 62 are releasably held by clips or holders 61, and the batteries 62 can be used for supplying electrical energy for the instrument, instead of using current from an outlet box or the like.

From the foregoing it is apparent that there has been provided an indicating mechanism which is especially suitable for permitting doctors, nurses, and the like to readily ascertain a patent's pulse rate. In use the sender 10 may be strapped on the wrist, leg, or other part of the body through the medium of the straps 14. Then, with the slots 21 contiguous to the person's body, the vibrations from the heart or the pulse beats will be picked up by the flexible diaphragm 15 whereby the contact 16 will move into and out of engagement with the contact 19 so as to complete the electrical circuit to the solenoid 28. Thus, the circuit to the solenoid 28 will be alternately opened and closed so that the plunger 29 will be reciprocated and this will cause pivotal movement of the lever 30. As the lever 30 pivots, the dog 34 engages the gear section 35 to rotate the gear section 35 and this in turn rotates the shaft 37. As the gear section 35 rotates and the shaft 37 rotates, the gear section 38 will also rotate and this in turn rotates the gear 24. As the gear 24 rotates, the shaft 25 will rotate and this will move the pointer 26. The pointer 26 will coact with the scale 27 to thus provide a quantitative determination of the number of pulsations in a unit of time. The stem 39 can be reciprocated by means of the knob 40 whereby the dog 41 will engage the gear section 35 so that the hand 26 can be moved or reset back to zero position when the counting operation is to begin. The stop watch 42 can be set so that the electrical current will be supplied to the sender 10 and receiver 22 for a predetermined period of time, as for example for one minute. Then, at the completion of the one minute period of time the electrical circuit to the sender 10 and receiver 22 will be broken. This arrangement eliminates the necessity of having the doctor or nurse stand right by the patient as the measurement is being taken, since the stop watch can be started and then the doctor can perform other tasks.

The battery 62 can be used instead of the source of supply of electrical energy indicated by the numeral 63.

By using a plurality of sending and receiving instruments, different measurements of the patient's body can be made, as for example a plurality of the sending devices 10 can be strapped to the legs, arms and body of the patient. By adding an additional meter, the blood pressure can also be recorded simultaneously. The stop watch 42 includes the single hand 46' and there is provided a means for stopping or starting and resetting the hand. The watch can be wound in any suitable manner. When the hand 46' reaches 60 seconds the watch will stop and the electrical connection will be broken since the inner end of the pin 50 will move into the slot 49 in the collar 59 whereby the contacts 58 will move away from the contacts 60 to break the electrical circuit. If desired the sender may be held in the patient's hand. The solenoid or electromagnet 28 receives impulses from the diaphragm and then actuates the escapement wheel. If desired, the apparatus can be made in the form of a permanent installation for a hospital bed or the like or else it can be made small enough to be carried in the pocket or in a doctor's brief case.

The diaphragm operates the solenoid which serves to actuate the indicator so that readings relating to a person's pulse or heart can be readily ascertained.

I claim:

1. In combination, a pulse sending instrument comprising a housing, a movable diaphragm mounted in said housing, a first contact carried by said diaphragm, a second contact positioned in said housing and adapted to be engaged by said first contact, a receiving instrument including an insulated casing provided with a dial face, a shaft rotatably mounted in said casing, a pointer carried by said shaft for coaction with said dial, a solenoid mounted in said casing and electrically connected to said second contact, a spring pressed plunger reciprocably arranged in said solenoid, gear means connecting said plunger to said pointer, and a stop watch electrically connected to said solenoid.

2. The structure as defined in claim 1, wherein said housing is provided with a plurality of spaced parallel slots.

3. The structure as defined in claim 1, and further including straps extending from said housing for connecting the pulse sending instrument to a portion of a person's body.

4. In combination, a pulse sending instrument comprising a housing, a diaphragm mounted in said housing, a first contact carried by said diaphragm, a second contact positioned in said housing and adapted to be engaged by said first contact, a receiving instrument including a casing provided with a dial face, a shaft rotatably mounted in said casing, indicator means carried by said shaft for coaction with said dial, a solenoid mounted in said casing and electrically connected to said second contact, a plunger reciprocably arranged in said solenoid, gear means connecting said plunger to said indicator means, and a timer electrically connected to said solenoid.

References Cited in the file of this patent
UNITED STATES PATENTS

| | | |
|---|---|---|
| 1,664,407 | Eshbaugh | Apr. 3, 1928 |
| 2,204,463 | Allen | June 11, 1940 |
| 2,216,737 | Crane et al. | Oct. 8, 1940 |